Nov. 3, 1964     H. T. PATTERSON ETAL     3,155,537
ROPE FINISH
Filed Feb. 24, 1959
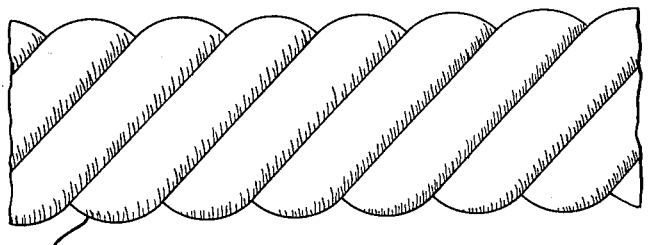
ROPE YARNS OF POLYESTER OR POLYAMIDE FILAMENTS
HAVING A FINISH OF A POLYETHYLENE OR MICROCRYSTALLINE
WAX IN AN OIL CARRIER.
INVENTORS
HUGH T. PATTERSON
ALFRED J. STROHMAIER
BY
ATTORNEY

United States Patent Office 3,155,537
Patented Nov. 3, 1964

3,155,537
ROPE FINISH
Hugh T. Patterson, Greenville, N.C., and Alfred J. Strohmaier, Seaford, Del., assignor to E. I. du Pont de Nemours and Company, Wilmington, Del., a corporation of Delaware
Filed Feb. 24, 1959, Ser. No. 794,824
4 Claims. (Cl. 117—138.8)

This invention relates to rope, cordage, thread, and funicular structures in general, and more particularly to such structures having a finish thereon to improve their properties.

In the following specification the word "rope" is meant to include all types of cordage and thread, unless indicated otherwise.

Processes for manufacturing and finishing synthetic rope are well known in the art. The synthetic ropes of the prior art, however, suffer from low set strength, low durability during wet repeat loading, loss of strength on extended exposure to heat, and discoloration under service conditions.

It is an object of this invention to provide finish compositions for rope and cordage which impart a high dry and wet strength and a high durability of the rope during dry and wet repeat loading. It is another object to provide finish compositions for rope which protect the rope during extended exposure to heat. Still another object is to provide a finish composition for rope which does not discolor. Other objects will become apparent as the description of the invention proceeds.

It has been found in accordance with this invention that these objects are met by applying to the rope yarns a finish composition of an oil containing a polyalkylene or a microcrystalline wax, preferably an oxidized wax. This component will hereinafter be designated as the "active ingredient."

Although the active ingredient is the essential factor, best results are obtained with finish compositions containing one component out of each of the four following classes: (1) an active ingredient (defined above), (2) a metallic soap, (3) an antioxidant, (4) an oil carrier wherein the other components are dispersed.

Among the polyalkylenes, the polyethylenes are the most readily available and therefore preferred.

These polyethylenes which may be either oxidized or non-oxidized should preferably have a melting point (ASTM, E-28-51T) between 80 and 200° C., a penetration (100 gms./5 sec./77° F.) between 1 and 10, an acid number between 9 and 50 and a saponification number between 9 and 100.

The microcrystalline waxes which may be either oxidized or non-oxidized should preferably have a melting point (ASTM, D-127-49) between 80 and 150° C., a penetration (100 gms./5 sec./77° F.) between 1 and 10, an acid number between 10 and 50 and a saponification number between 30 and 100.

The drawing is a diagrammatic view of a rope made of the improved yarns of this invention, of polyester or polyamide filaments and having a finish of one of the above waxes in an oil carrier.

If the component of the first class is omitted, the protection against strength loss on exposure to heat and light can be obtained by radically increasing the concentration of antioxidant, but the protection of wet strength and durability on wet repeat loading remain poor, and discoloration frequently appears at these higher concentrations of antioxidant.

Among examples of suitable oxidized polyethylene polymers are the following commercially available products: Sizelene H.S. and Sizelene H.P. from Southern Chemical Association, Epolene E from Eastman Chemical Products, Inc., Plaskon 8429, also called A-C Polyethylene 8429 from Allied Chemical Company, Inc., Cardis Polymer No. 8 from Warwick Wax Company, Inc., and Moropol H-45, Moropol X-105, Moropol 600 and Moropol 700 from Moretex Chemical Products Co.

Examples of suitable non-oxidized polyethylene polymers are the following commercially available polymers: Alathon 3, Alathon 10, Alathon 17 and Alathon 15X from E. I. du Pont de Nemours and Company and Epolene N and Epolene C from Eastman Chemical Products, Inc.

Examples of suitable oxidized microcrystalline hydrocarbon waxes are the following commercially available waxes: Crown Wax 15, Crown Wax 23, Crown Wax 36 and Crown Wax R50 from Petrolite Chemical Corporation, Cardis 1 Wax, Cardis 262 Wax, Cardis 314 Wax, Cardis 319 Wax and Cardis 320 Wax from Warwick Wax Company, Inc.

Although oxidized microcrystalline waxes are preferred in the practice of this invention because of the very striking improvements in rope properties, non-oxidized microcrystalline waxes are operative and also result in significant (though less striking) improvements in rope properties. Examples of suitable non-oxidized microcrystalline waxes are Crown Wax 500, Crown Wax 700 and Crown Wax 1035 from the Petrolite Corporation, and Mekon Y-20, Warco Wax 170-A Yellow, and Fortex from the Warwick Wax Company.

Among the suitable metallic soaps are the following: aluminum palmitates, aluminum stearates, magnesium-, lead-, zinc-, calcium- and barium-stearates, -palmitates and -oleates.

Examples of suitable antioxidants are the following: 2,2'-methylene bis(4-methyl-6-tertiary butyl phenol), propyl gallate, N-phenyl-α-naphthylamine, Antox (a condensation product of butyraldehyde-anilino), Tenox II (maximum 20% propyl gallate, maximum 40% butylated hydroxy anisole, maximum 10% citric acid and minimum 30% propylene glycol).

Among the carriers of Class (4) oil type carriers are preferred. Aqueous dispersions of the components of Classes 1, 2 and 3 result in the desired improvements in yarn properties but sometimes create processing problems due to gumming and yarn shrinkage. Suitable oil type carriers are mineral oils with viscosities in the range from kerosenes to heavy motor oils; plain and blown vegetable oils such as peanut oil, corn oil and coconut oil; plain and blown animal oils such as lard; plain and blown fish oils such as sperm oil; synthetic oils such as non-volatile esters and non-volatile ethers. Among these preferred oil type carriers colorless, highly treated mineral oils with viscosities in the range from kerosene to heavy motor oil are most suitable. Examples of such oils are: No. 40 White Oil (Pennsylvania Refining Company), Bayol 50 White Oil (Esso Standard Oil Company), Bayol D, F, or 85 (Esso Standard Oil Company), Marcol GX, JX, KX (Esso Standard Oil Company), Wyrol CX, E, J (Esso Standard Oil Company), Fractol A (Esso Standard Oil Company) and Primol B, C, D (Esso Standard Oil Company).

To have the improved properties the rope must contain between 0.01 and 10 weight percent of the active ingredient and preferably between 0.10 and 1.0 weight percent. This may be achieved by applying to the rope or to the thread or yarn from which the rope is to be made the corresponding amount of finish containing the active ingredient in the proper concentration.

The upper limit of the operative concentration of the active ingredient in the finish is determined by its dispersibility. At room temperature the operative concentration is between 0.1 and 25 weight percent for most polyethylenes and waxes and the preferred range is between 5 and 15 weight percent. Though not preferred, when the finish is applied at elevated temperature (about 100° C.) the concentration of the active ingredient can be as high as 90%. At concentrations higher than 90% the finish will flake unless a plasticizer is added.

The following tests are used to obtain the values indicated in the examples.

A. *Dry breaking strength test.*—An eye splice (16 inch eye) is made on each end of a dry 18-foot long rope sample of 5½-inch circumference balanced ply yarn construction. The rope sample is attached to the capstans of a rope breaking machine by means of the eye splice. The breaking strength is measured in pounds.

B. *Wet breaking strength test.*—The wet breaking strength is measured according to Test A, but on a wet rope.

C. *The wet strength loss.*—C (percentage) is calculated from the results of Tests A and B as follows:

$$C = \frac{(A-B)}{A} \times 100$$

D. *Wet repeat loading Test.*—The sample is prepared and installed on the rope breaking machine as in Test A. The load of the rope breaking machine is brought to 35,000 pounds and then reduced to zero, and the rope lowered into a water pan located below the rope sample. Following the wetting the load is reapplied and released. The loading, releasing and wetting is repeated until the rope breaks. The values reported are the number of cycles the rope withstands. A plus following the value indicates that the test was discontinued after that number of cycles without breaking the rope.

E. *Heat ageing strength test.*—Five samples are prepared as in Test A, but the rope has a ½-inch diameter instead of the 5½-inch circumference. The samples are heat aged for five days at 175° F. in a hot air oven, and then tested in a rope breaking machine as in Test A, and average value for the five sample is recorded.

F. *Heat ageing strength loss test.*—Five samples are prepared and tested as in Test E, but the heat ageing is omitted. From these two averages, E and A' the percentage strength loss due to heat aging is calculated:

$$F = \frac{(A'-E)}{A} \times 100$$

G. *Rope discoloration test.*—A sample of rope is boiled in water for five hours and any discoloration observed.

H. *Rope discoloration test.*—A sample of rope is exposed to standard fluorescent light for seven days and any discoloration observed.

EXAMPLE I

*Preparation of Yarn*

66 nylon (polyhexamethyleneadipamide) containing an antioxidant as taught in U.S. Patent 2,705,227 was melt spun and drawn to a 140 filament 840 total denier yarn of 8.8 grams per denier tenacity.

*Preparation of Finish*

2.0 parts of aluminum monopalmitate and 0.1 part of 2,2'-methylene bis(4-methyl-6-tertiary butyl phenol) are dissolved at 98° C. in 58.6 parts of light liquid petrolatum, Saybolt viscosity, SUS, at 100° F. 50.0.

Separately 10.0 parts of oxidized polyethylene (Epolene E: softening point ASTM, D–36–26, 102° C., penetration (100 g./5 sec./77° F.) 2 mex., acid number 7–13, saponification No. 24–25, molecular weight, approx. 2500) are dissolved in 29.3 parts of the light liquid petrolatum. The two solutions are mixed rapidly at 98° C. resulting in a viscous gel. After cooling to room temperature under continuous stirring, the finish becomes a thin liquid. If stored the finish should be agitated continuously to prevent settling.

*Application of Finish to Yarn*

The finish is applied by means of a rotating roll dipping into the finish. The roll is wiped dry by the yarn running over the roll surfaces.

*Preparation of Rope*

From the yarn is made a rope of balanced ply yarn construction. The properties of the rope are recorded in Table I and are compared to rope without the finish (Control 1) and to rope with the finish but omitting the oxidized polyethylene and increasing the concentration of the antioxidant in the finish 5-fold (Control 2).

EXAMPLE II

Yarn and finish and rope are prepared and the finish applied to the yarn following the techniques of Example I, but instead of the oxidized polyethylene is used a non-oxidized polyethylene (Alathon 17). The rope properties are recorded in Table I and are compared to properties of the rope without the finish (Control 1) and with the finish but omitting the non-oxidized polyethylene and increasing the concentration of antioxidant in the finish five fold (Control 2).

EXAMPLE III

*Preparation of Yarn*

The yarn is prepared following the techniques of Example I.

*Preparation of Finish*

2.0 parts aluminum monopalmitate and 0.1 part 2,2'-methylene bis(4-methyl-6-tertiary butyl phenol) and 10.0 parts Crown Wax 23 (melting point ASTM, D–127–49: 82° C., penetration 100 gms./5 sec./77° F.: 4–6, acid number 20–25, saponification number 55–65) are dissolved in 87.9 parts of light liquid petrolatum at 98° C. The finish is liquid at 98° C. and remains liquid upon cooling to room temperature. While stored the finish should be stirred continuously to prevent settling.

*Application of Finish to Rope*

The finish is applied to the yarn by means of a roll as described in Example I.

The properties of the rope are recorded in Table I and are compared to rope without the finish (Control 1) and to rope with the finish but omitting the oxidized microcrystalline wax and increasing the concentration of antioxidant in the finish 5-fold (Control 2).

EXAMPLE IV

A rope is prepared as in Example III, except that a non-oxidized microcrystalline wax (Crown Wax 1035) is used as active ingredient of the finish instead of the oxidized microcrystalline wax (Crown Wax 23). The properties of the rope are recorded in Table I and are compared to rope without the finish (Control I) and to rope with the finish but omitting the non-oxidized microcrystalline wax and increasing the concentration of antioxidant in the finish 5-fold (Control 2).

EXAMPLE V

A rope is prepared as in Example I, except that 6 nylon is used instead of 66 nylon. The properties of the rope are recorded in Table I and are compared to rope made from 6 nylon without the finish (Control 3).

EXAMPLE VI

A rope is prepared as in Example III except that 6 nylon is used instead of 66 nylon. The properties of the rope are recorded in Table I and compared to rope made from 6 nylon without the finish (Control 3).

TABLE I

| Test | A | B | C | D | E | F | G | H |
|---|---|---|---|---|---|---|---|---|
| Control 1 | 75,000 | 52,400 | 30 | 35 | 63,000 | 18 | None | None |
| Control 2 | 81,000 | 66,000 | 19 | 110 | 81,000 | 0 | Pink | Blue |
| Example I | 87,000 | 78,500 | 11 | 300+ | 87,000 | 0 | Nil | Nil |
| Example II | 86,000 | 76,000 | 12 | 300+ | 86,000 | 0 | Nil | Nil |
| Example III | 84,000 | 77,000 | 8 | 300+ | 84,000 | 0 | Nil | Nil |
| Example IV | 80,000 | 65,000 | 19 | 150 | 80,000 | 0 | Nil | Nil |
| Control 3 | 75,000 | 67,000 | 11 | 35 | 75,000 | 0 | Nil | Nil |
| Example V | 78,000 | 70,000 | 10 | 300+ | 78,000 | 0 | Nil | Nil |
| Example VI | 84,000 | 76,000 | 10 | 300+ | 84,000 | 0 | Nil | Nil |

The examples were repeated using 2,2'-thio bis (4-methyl-6-tertiary butyl phenol) with very similar results in tests A to H.

Ropes whereof the properties are improved by the finish compositions of this invention include ropes made of continuous and discontinuous, natural and synthetic filaments. These improvements are particularly significant when the rope is made of polyamides or poly(ethylene terephthalate). While the invention has been illustrated in the examples by the use of nylon, it is to be understood that ropes made from the above materials or mixtures thereof may be finished as illustrated in the examples with comparable improvements in tests A to H.

The rope to which the finish compositions of this invention have been applied has an obvious use in applications such as marine rope, petroleum rigs for drillers, yachting rope, fishing nets, wrapping twines, upholstery twines, various cords, sewing twines and threads, etc.

It will be apparent that many widely different embodiments of this invention may be made without departing from the spirit and scope thereof, and therefore it is not intended to be limited except as indicated in the appended claims.

We claim:
1. In rope and cordage manufacture wherein the rope yarns are composed of synthetic linear condensation polymer filaments selected from the class consisting of polyesters and polyamides, the improvement for imparting high dry and wet strength, and high durability, which comprises a rope yarn of said filaments in combination with a finish of wax and an oil carrier therefor having a viscosity in the range from that of kerosene to that of heavy motor oil, in which the amount of wax is between 0.01 and 10 percent by weight of the yarn and between 0.1 and 25 percent by weight of the finish, and the wax is selected from the group consisting of (1) polyethylenes having a melting point between 80° and 200° C., a penetration between 1 and 10, an acid number between 9 and 50, and a saponification number between 9 and 100, and (2) microcrystalline waxes having a melting point between 80° and 150° C., a penetration between 1 and 10, an acid number between 10 and 50, and a saponification number between 30 and 100.

2. The improvement defined in claim 1 in which the amount of wax is between 0.10 and 1.0 percent by weight of the yarn and between 5 and 15 percent by weight of the finish.

3. The improvement defined in claim 1 in which the finish contains a metallic soap selected from the group consisting of aluminum palmitates, aluminum stearates and magnesium-, lead-, zinc-, calcium- and barium-stearate, -palmitates and -oleates.

4. The improvement defined in claim 1 in which the finish contains an antioxidant for the yarn.

References Cited in the file of this patent
UNITED STATES PATENTS

| | | |
|---|---|---|
| 214,148 | Hunt | Apr. 8, 1879 |
| 217,948 | Keith | July 29, 1879 |
| 2,137,339 | Gwaltney | Nov. 22, 1938 |
| 2,139,343 | Williams et al. | Dec. 6, 1938 |
| 2,348,687 | Abrams et al. | May 9, 1944 |
| 2,402,903 | Massey et al. | June 25, 1946 |
| 2,448,799 | Happoldt et al. | Sept. 7, 1948 |
| 2,663,989 | Schlatter | Dec. 29, 1953 |
| 2,664,409 | Aickin et al. | Dec. 29, 1953 |
| 2,773,812 | Tench | Dec. 11, 1956 |
| 2,790,764 | Lange et al. | Apr. 30, 1957 |
| 2,846,321 | Wenaas et al. | Aug. 26, 1958 |
| 2,849,324 | Cox | Aug. 5, 1958 |
| 2,862,282 | Beebe | Dec. 2, 1958 |
| 2,862,832 | Shepherd | Dec. 2, 1958 |
| 2,888,365 | Corkum | May 26, 1959 |
| 2,914,430 | King et al. | Nov. 24, 1959 |
| 2,944,918 | Nagel et al. | July 12, 1960 |
| 2,980,556 | McClelland | Apr. 18, 1961 |

OTHER REFERENCES

Renfrew et al.: Polythene, pp. 241–246, Iffe and Sons, London, 1957.

An Abstract of "Fiber Processing," vol. 8, No. 11, pp. 118–121 and No. 12, pp. 82–84, published by Seni Kenkyusha, Ltd., 1956.

The Chemistry and Technology of Waxes, Warth (1956), pp. 319 and 320 pertinent.